(12) United States Patent
Johnson

(10) Patent No.: US 6,195,931 B1
(45) Date of Patent: Mar. 6, 2001

(54) CONVERTIBLE CRAB TRAP WITH QUICK RELEASE HINGES

(75) Inventor: Harvey Johnson, North Bend, WA (US)

(73) Assignee: The Danielson Company, Inc., Auburn, WA (US)

(*) Notice: Subject to any disclaimer, the term of this patent is extended or adjusted under 35 U.S.C. 154(b) by 0 days.

(21) Appl. No.: 09/326,520

(22) Filed: Jun. 4, 1999

(51) Int. Cl.[7] ................................... A01K 69/10
(52) U.S. Cl. ................... 43/105; 43/104; 43/100
(58) Field of Search .................. 43/100, 102, 103, 43/104, 105; 16/253, 225; 24/129 A, 136 L, 132 R, 459; 403/344, 321, 119, 164, 165, 166

(56) References Cited

U.S. PATENT DOCUMENTS

| | | |
|---|---|---|
| 530,156 | 12/1894 | Becker et al. |
| 664,926 | 1/1901 | Briggs . |
| 957,618 * | 5/1910 | Masek . |
| 1,074,276 | 9/1913 | Masek . |
| 1,887,059 | 11/1932 | Kraus et al. . |
| 2,913,791 * | 11/1959 | Martin . |
| 2,918,749 | 12/1959 | Portner . |
| 3,055,139 | 9/1962 | Condello . |
| 4,182,068 | 1/1980 | Iannucci ................................. 43/41 |
| 4,982,525 | 1/1991 | Miller .................................... 43/105 |
| 5,353,541 | 10/1994 | Jonason et al. ....................... 43/100 |
| 5,398,441 | 3/1995 | Melanson ............................. 43/100 |

* cited by examiner

Primary Examiner—Peter M. Poon
Assistant Examiner—Judith A. Nelson
(74) Attorney, Agent, or Firm—Graybeal Jackson Haley LLP

(57) ABSTRACT

A trap having a base panel, two side panels, and two end panels held together in an "A"-frame shape by tubular hinges of fixed and quick release type. Each panel is constructed from a wire mesh having a perimeter frame that includes linear members. A plurality of fixed hinges are used to rotationally link the several panels to one another. Each fixed hinge is preferably a cylindrical element of resilient material having a longitudinal or axially aligned slot that may be expanded to receive a pair of linear members. At least one quick-release type hinge is preferably used to facilitate rapid collapse and erection of the trap. Each quick-release type hinge has two axially nested cylinders, each defining a slot having sufficient width to accommodate a linear member without user manipulation. Alignment of the two slots permits ingress and egress of a pair of linear members into and out of the open cylinder defined by the inner cylinder. To promote stowage of the trap when in the collapsed state, selected hinges have an internal diameter that is greater than the other hinges, thereby permitting displacement of the resident linear members and facilitating a flat profile when the trap is collapsed.

19 Claims, 5 Drawing Sheets

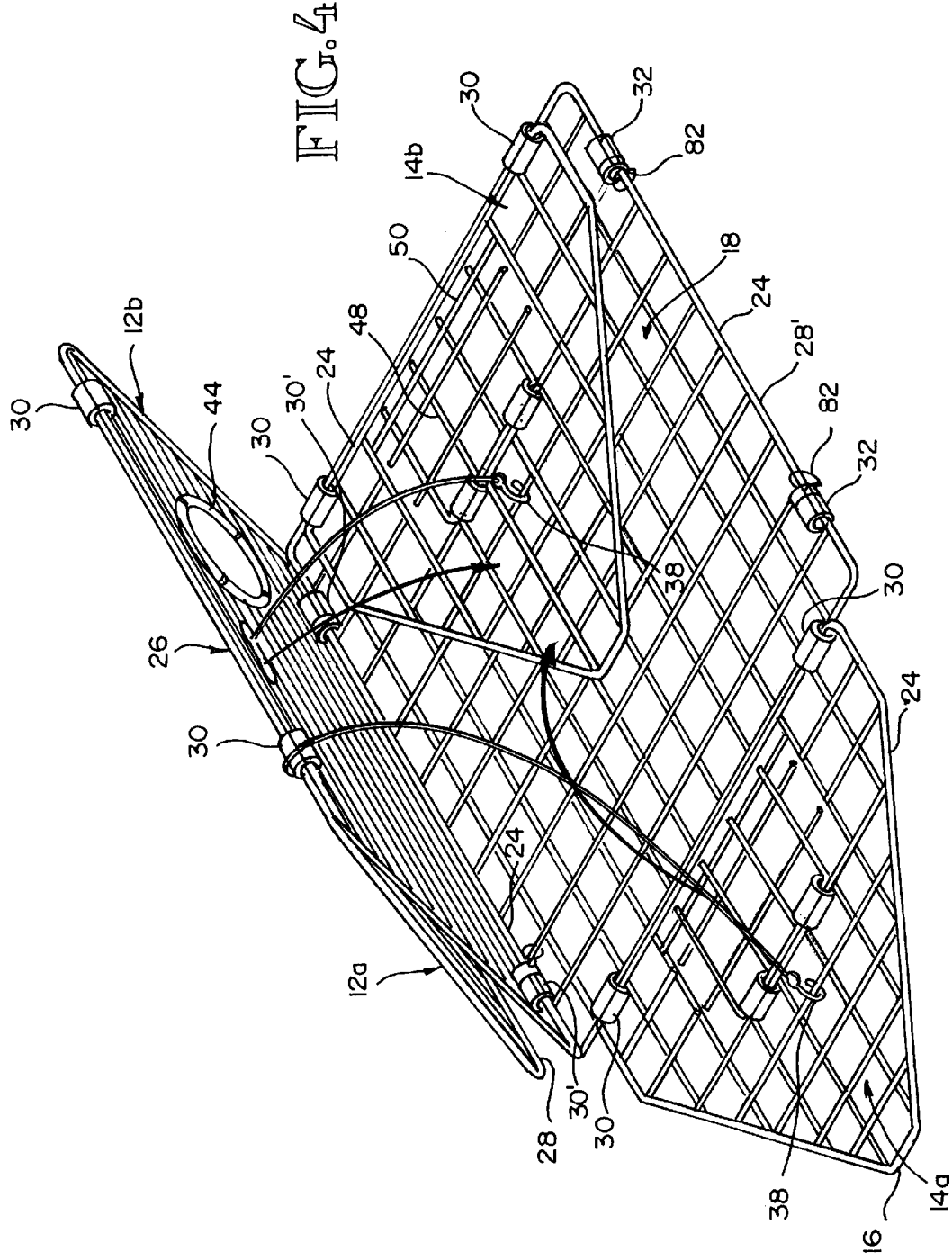

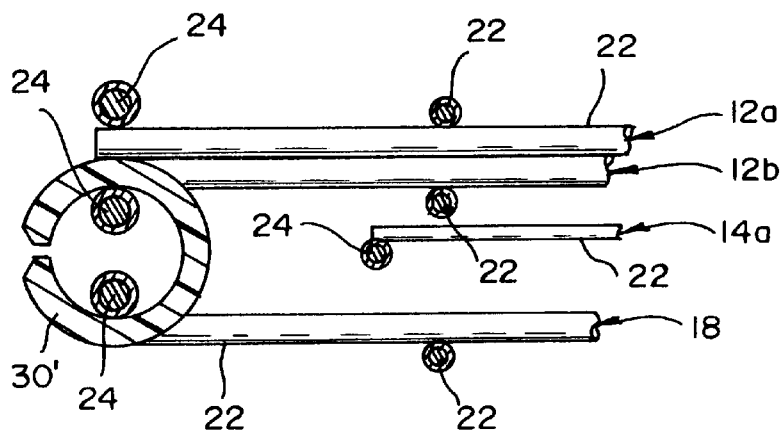
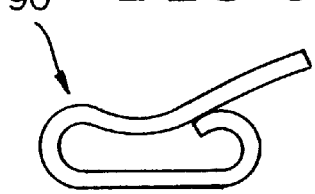
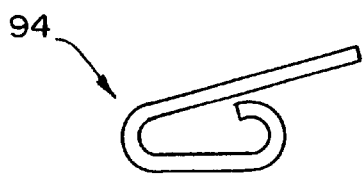

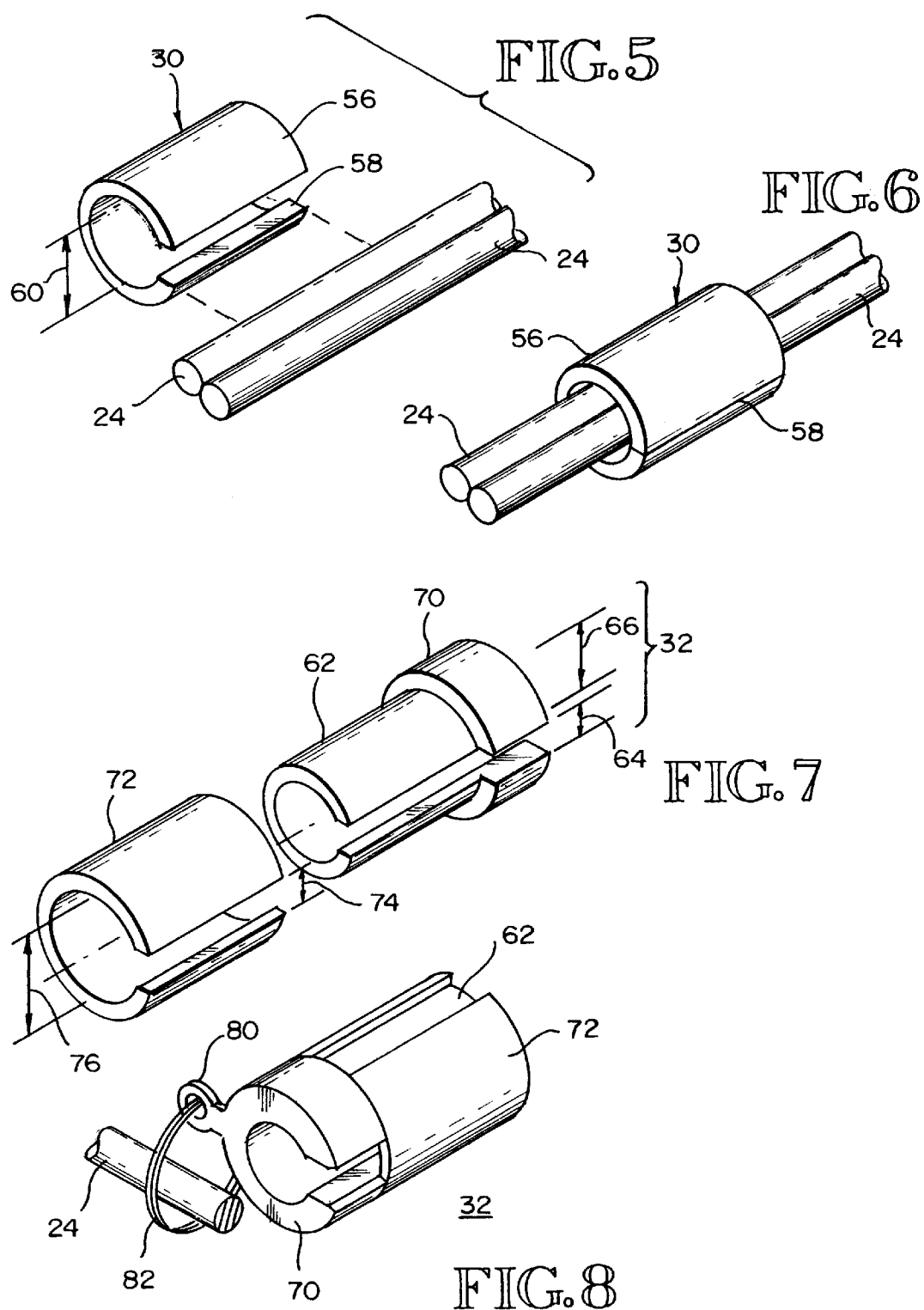

CONVERTIBLE CRAB TRAP WITH QUICK RELEASE HINGES

FIELD OF THE INVENTION

This invention pertains generally to animal traps and more particularly to an underwater crab trap and a method of constructing same using fixed and quick-release hinges.

BACKGROUND OF THE INVENTION

In 1996, the total harvest of domestic crabs reached nearly 400,000,000 pounds. This figure represents both commercial and recreational harvests. The principle method for harvesting crabs is by using baited crab traps. Because different types of crabs reside in different environments, crab traps are used in a variety of bottom conditions ranging from flat sandy bottoms to rocky, uneven bottoms with large kelp beds. In some circumstances, traps are often left unattended for several hours or longer; in other circumstances, the traps are checked and the catch harvested as often as every few minutes.

Over the years, there have been many inventions relating to crab or other underwater animal traps and their methods of construction. Such traps were normally lowered from a boat deck or other above-water surface to the floor, after being baited, and were originally made of box-like wooden frames stretched with a netting or mesh material. Updates and changes have been made to the shape, material, and operation of the crab traps with varying degrees of success. As a result of either ingenuity or marketing efforts, there are many shapes and types of crab traps in use today, including pyramidal, conical, and rectangular shapes. One of modifications is an "A"-frame or triangular prism-type with a wide bottom, an apex top, and triangular sides. The wide bottom helps to ensure that the crab trap rests securely on the ocean floor in the upright position, and the apex top helps to ensure that the crab trap can be raised through the water by its retrieval line with decreased chances of getting fouled in seaweed or other debris.

Collapsibility for ease of storage is a feature of most recreational crab traps presently in production. Furthermore, crab traps are now made of more durable materials than the original wood: they are usually of metal frames with metal wire mesh. The wires are then coated with an appropriate material to make handling easier and to prevent exposure of the metal to the water. However, at least one patented invention, U.S. Pat. No. 4,982,525, suggests that plastic could be used for the frames and mesh.

Additionally, many recent inventions relate to the opening of the crab trap once it is underwater and ready to be used. End panels are often spring-loaded or weighted to provide positive opening. The spring-loading of a trap may be provided by a coil spring wrapped around the bottom of the side and bottom frames and effects positive opening by applying an outward bias against the end panels. Alternatively, weighted end panels use gravity to pull the panels open and keep them in the open position.

Although the above-mentioned improvements have enhanced the operation and use of crab traps, many problems remain, including difficulty and danger in removing the catch. In many instances, the trapsetter must take the catch out of the crab trap through the same openings through which the catch entered the trap. Alternatively, the crab trap may be such that the trapsetter must nearly collapse the entire trap in order to gain access to the catch. In this case, the trap no longer is retaining the catch and the possibility exists that the catch will escape.

Furthermore, the crab trap may foul in itself due to its own construction. The tips of a triangular configured trap (whether pyramidal or A-frame) many interfere with other trap components when the side panels are pulled into the closed position for retrieval of the trap. Such fouling increases the difficulty of opening the side panels for harvesting the catch.

Additionally, metal hinges used on many traps are subject to corrosion and therefore present further problems. Corroded hinges may seize and prevent not only the safe and easy operation of the crab traps but also the proper collapsing of the crab traps for stowage.

SUMMARY OF THE INVENTION

An object of the present invention is to provide an effective underwater crab trap that is easy and safe to use. Another object of the present invention is to provide a crab or other animal trap using tubular hinges to facilitate use and stowage of the invention.

The present invention is an underwater trap that is preferably convertible so that it may be used in a tended or an untended configuration, selectable at the discretion of the trapsetter, and may be readily collapsible so that it can be conveniently stowed. The present invention also relates to a trap wherein the panels that comprise the trap are rotationally linked together with tubular hinges of either fixed or quick-release type.

The trap invention comprises at least four foramenous panels, a plurality of hinges to selectively link the panels, and at least one retrieval line. The panels are preferably constructed of mesh material, each having a heavy gauge perimeter frame. The four panels are more specifically a base panel and at least three side panels rotationally linked thereto by way of hinge members. In this configuration, the trap resembles a three-sided pyramid when fully assembled as all panels have a triangular appearance. If an "A"-frame construction is desired, then four side panels (two square/rectangular side panels and two triangular end panels) are rotationally linked to the base panel, which is also square/rectangular. Similarly, if a four-sided pyramid design is desired, then the four side panels are also rotationally linked to the base panel, however, the side panels all have a triangular configuration while the base panel is generally square.

Several features of the invention relate to the hinge members used to rotationally link the side/end panels to the base panel. One feature of the invention relates to the collapsibility of the trap. By utilizing hinge members of various diameters to rotationally link selected side panels to the base panel, it is possible to completely collapse the trap so that the resulting structure is generally flat. Each panel is hinged to at least one other panel in all configurations. The means for hinging one panel to another comprises a collar or tubular member that preferably has an axially congruent or longitudinal seam or split, thereby permitting the collar member to be attachable to the perimeter frame portions of selected panels. Because a preferred embodiment has the collar member constructed from an elastic material such as plastic, the collar member is biased to retain its cylindrical or tubular form after having been manipulated to engage one or more panels. By selecting collar members having differing internal diameters, varying levels of rotational "looseness" can be achieved. Consequently, the pivot axis of one panel in relationship to another panel can be adjusted, thereby providing the ability to collapse the invention into a relatively flat structure as will be further detailed below.

Another feature of the invention is also directed to the hinge members. Certain hinge members are of the quick release type. These hinge members have two portions, namely an inner collar coaxially nested in an outer collar. Thus, the inner collar has an internal diameter defining an open cylinder wherein the perimeter frame portions of a selected pair of panels will reside, and an outer diameter that defines a peripheral surface. The outer collar has an internal diameter defining an open cylinder that is generally greater than the outer diameter of the inner collar. Consequently, the inner collar closely resides in the open cylinder of the outer collar. Both the inner and outer collars have an axially congruent or longitudinal slot formed in their wall. Therefore, when the two slots are aligned, radial access to the open cylinder of the inner collar can be achieved.

These and other features of the invention will become apparent from inspection of the accompanying drawings and review of the following description of the invention.

BRIEF DESCRIPTION OF THE DRAWINGS

FIG. 4 is a perspective view illustrating the collapsibility of the trap after disengagement of a side panel from the bottom panel using quick-release hinges;

FIG. 4A is a partial cross sectional elevation view detailing the perimeter frame displacement when the trap is in the collapsed position, and the use of oversized hinges to facilitate perimeter portion displacement and collapse of the various panels;

FIG. 5 is a perspective detail view of a fixed hinge shown in an expanded state before being released around two perimeter frame portions;

FIG. 6 is a perspective detail view of the fixed hinge of FIG. 5 after being released around the two frame edges;

FIG. 7 is an exploded perspective view of a quick-release hinge detailing the relationship between its inner and outer collars;

FIG. 8 is a perspective detail view of the quick-release hinge in the assembled and locked position, and illustrating the obstructed slot alignment between the inner collar and the outer collar; and FIGS. 9, 10, and 11 detail, in cross sectional elevation views, alternative hinge designs.

DETAILED DESCRIPTION OF THE INVENTION

Figure 1:
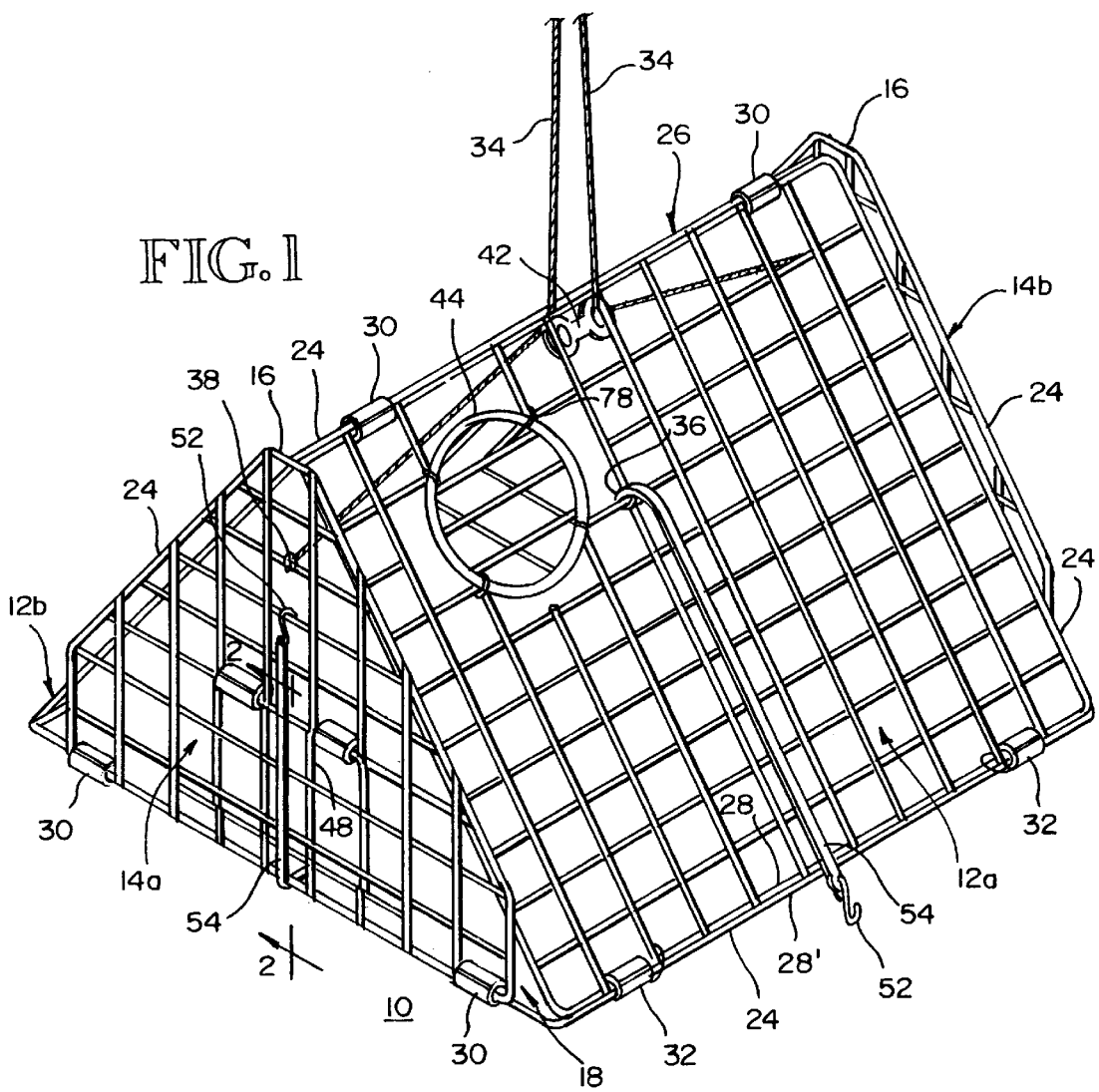
FIG. 1 is a perspective view of the trap shown in the closed or untended position.
Figure 3:
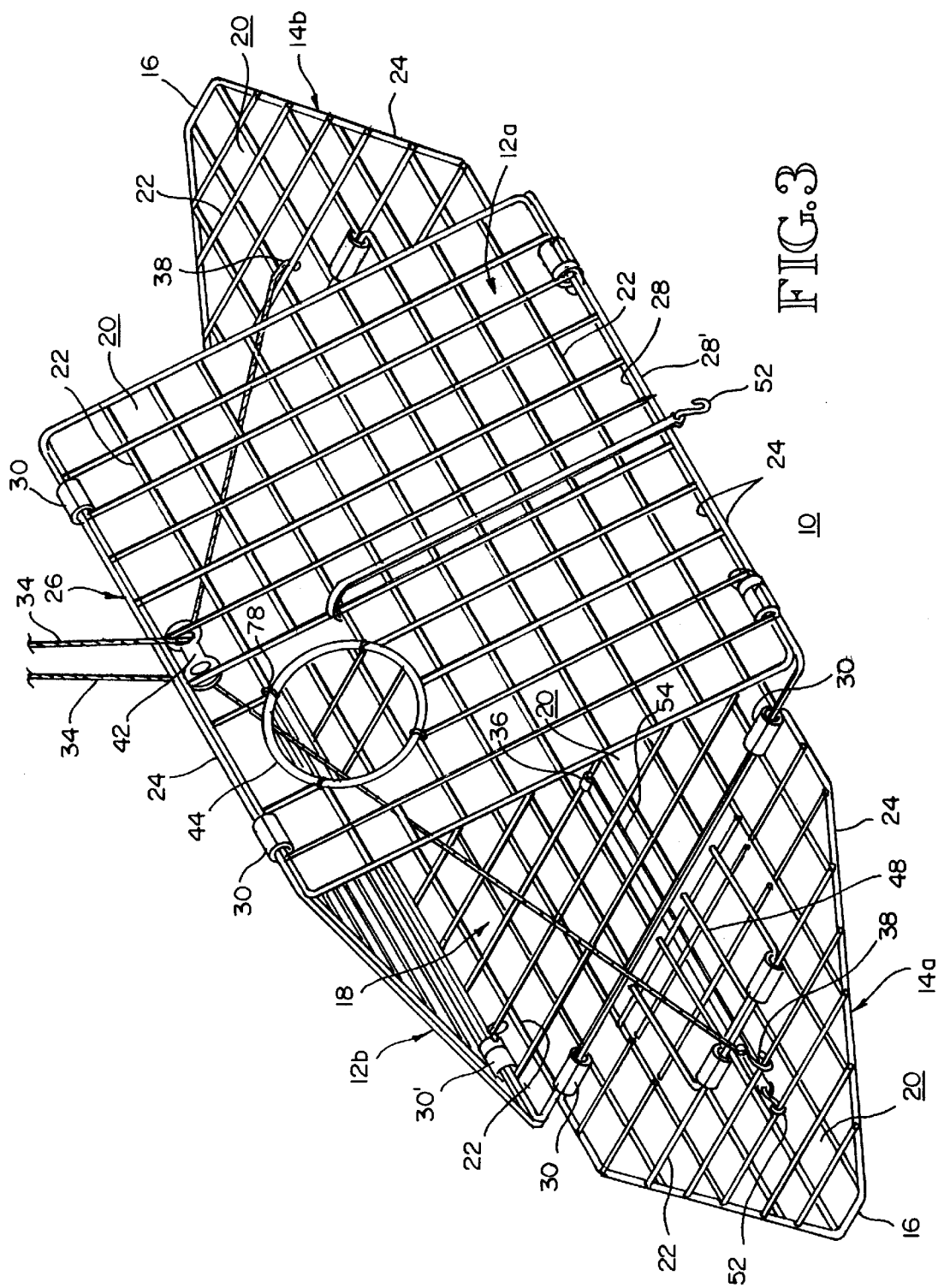
FIG. 3 is a perspective view of the trap of FIG. 1 shown in the open or tended position.

FIGS. 1 and 3 best illustrate a preferred embodiment of the present invention, namely convertible crab trap 10. FIG. 1 shows crab trap 10 in the closed or untended position while FIG. 3 shows crab trap 10 in the open or tended position. Crab trap 10 is preferably constructed of two rectangular side panels 12a and 12b, two generally triangular end panels 14a and 14b, and rectangular bottom panel 18. Each panel 12a and 12b, 14a and 14b, and 18 consists of a perimeter frame 24 member and mesh 22 having openings 20 defined thereby. The precise dimensions of openings 20 in mesh 22 of each panel are a design consideration. In a preferred embodiment, openings 20 are approximately 1.5" square, but it is necessary only that openings 20 be small enough to prevent escape of the targeted crabs but large enough for the passage of water and items not intended to be caught, e.g., pieces of seaweed and smaller animals. To enhance durability and integrity of trap 10, all panels are constructed of heavy gauge wire steel that has been coated with vinyl to make handling easier and to prevent exposure of the metal to corrosive environments. In a preferred embodiment, each perimeter frame member 24 is formed from wire stock that is of a heavier gauge than mesh 22.

Located near apex edge 26 at side panels 12a and 12b are two escape rings 44 that are attached thereto by way of string 78, which is preferably biodegradable. Escape rings 44, which are approximately 4.25" in diameter, facilitate the escape of undersized crabs that are not intended to be caught by crab trap 10 but which might find their way there into.

Drawing attention specifically to FIG. 1, it can be seen that end panels 14a and 14b are "oversized" in relationship to side panels 12a and 12b when trap 10 is in the closed configuration. In addition, top portions 16 of end panels 14a and 14b have been truncated so as not interfere with the operation of trap 10. While this truncation is not necessary for the operation of trap 10, it beneficially prevents unintended fouling of end panels 14a and 14b with the apex of trap 10 while in the closed configuration. By oversizing end panels 14a and 14b, the likelihood of these panels inadvertently rotating into trap 10 is eliminated without the user perceiving any performance limitation.

Each end panel 14 preferably has an entry gate 48 through which crabs may enter trap 10 while it is in the closed configuration. Each entry gate 48 is constructed of wire mesh 22, and is hinged at the top to an end panel 14 with two fixed hinges 30. Because fixed hinges 30 are bidirectional, the entry gate 48 is capable of swinging in either direction—outward or inward. Thus, retention bar 50 is permanently attached to the bottom inside portion of entry gate 48 to prevent outward swinging thereof. In this way, the crabs are allowed to enter the crab trap 10, but not exit.

Figure 2:
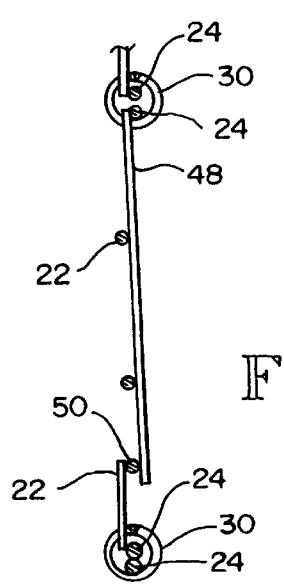
FIG. 2 is a cross sectional elevation view taken substantially along the line 2—2 in FIG. 1 detailing the nature of the fixed hinges.

Panels 12a and 12b, and 14a and 14b are linked to panel 18 by a plurality of fixed hinges 30 and quick-release hinges 32, as are panels 12a and 12b to each other. All hinges 30 and 32 are preferably of a tubular design and are constructed from a plastic material having a high degree of resiliency. FIGS. 5 and 6 show that fixed hinge 30 comprises a one-piece collar 56 defining an axially congruent slot 58 extending along the entire axial length of collar 56. Internal diameter 60 should be sufficient to encompass a pair of perimeter frame members 24 without encountering noticeable interference. See FIG. 2 for a cross sectional elevation view illustrating the residency of perimeter frame members 24 within a pair of hinges 30. In the preferred embodiment, collar 56 is approximately 1.375" long and has inner diameter 60 of approximately 0.375".

FIG. 7 is an exploded view showing quick-release hinge 32, which comprises collars 62 and 72. Inner collar 62 has an axial slot 64 extending along the entire axial length thereof; outer collar 72 has axial slot 74 extending along the entire axial length thereof. Inner collar 62 has molded eye 80 (see FIG. 8) to permit hinge 32 to be secured to trap 10 via split ring 82. Inner collar 62 also has shoulder portion 70 around its outer periphery on one end, against which outer collar 72 abuts when the two collars are assembled as shown in FIG. 8. Inner diameter 66 of inner collar 62 is "oversized" so that it is large enough to allow the free movement of two perimeter frame portions 24 enclosed therein. Inner diameter 76 of outer collar 72 is sized so that it will closely fit the outer diameter of inner collar 62 in the assembled position. In the preferred embodiment, inner collar 62 has inner diameter 66 of approximately 0.375", and outer diameter 68 of approximately 0.625"; outer collar 72 has inner diameter 76 of approximately 0.6875".

As noted earlier, it is only necessary that the outer surface of collar 62 and the inner surface of collar 72 have a circular cross section, to facilitate rotation of collar 72 thereabout and movement of perimeter frame members 24 there in, respectively. In certain circumstances, it may be desirable to provide raised ridges or knurling on the outer surface of collar 72 and shoulder 70 to assist the user during opening or closing of hinge 32.

To assemble quick-release hinge 32, outer collar 72 is slipped over inner collar 62 until it comes to rest against shoulder 70. In the assembled condition, when collars 62 and 72 are rotated with respect to each other such that their axial slots 64 and 74 are aligned as shown in FIG. 7, one or two perimeter frame members 24 can be inserted into hinge 32 or removed therefrom. When located on edges 28 and 28' of trap 10, quick-release hinges 32 are held in place lengthwise by the wire mesh 22, i.e., the two collars 62 and 72 are not allowed to slide apart. By engaging split ring 82 with any viable portion of trap 10, accidental loss of hinge 32 when in the open position can be all but eliminated.

Referring back to FIGS. 1 and 3, several elastic bands 54 with metal hook 52 at one end and formed eyelet 36 at the other end are used with trap 10 to create an end panel opening bias. Thus, when trap 10 is being used in the open or tended position, elastic bands 54 can be used to bias end panels 14 toward the open position. To accomplish such positive opening, eyelet 36 anchors elastic band 54 to wire mesh 22 near the center of the bottom panel 18, and elastic band 54 is extended around perimeter frame members 24 of bottom panel 18 and a side panel 14, and hook 52 is engaged to one of the cross wires of wire mesh 22 of an end panel 14, as is best shown in FIG. 3. Alternatively, elastic bands 54 can be used to keep end panels 14 in the closed position. Naturally, care must be taken that the location of hook 52 is chosen such that neither hooks 52 nor elastic bands 54 interfere with the operation of entry gate 48 or cover escape rings 44 when trap 10 is in the untended configuration.

To effectuate a closing bias to end panels 14, lines 34 are employed. Trap 10 includes line guide 42, positioned in the center of apex edge 26 of trap 10. Line guide 42 is made of metal, is fastened to one of the side panels 12 and comprises a small piece of metal with two holes for receiving line 34. For ease of manufacture, line guide 42 can be applied to both side panels 12. Each line 34 passes through a retrieval line guide 42, where each is directed to a termination point 38 on opposite end panels 14. At point 38, each line 34 is secured to mesh 22 of an end panel 14. In this manner, when each line 34 is in tension, a closing bias on end panels 14a and 14b is present, such as when trap 10 is being lowered or raised by a retrieval line connected to each line 34.

A significant feature of the present invention concerns the ability of trap 10 to be quickly and effectively collapsed for stowage. Turning then to FIGS. 4 and 4a, it can be seen that when side panel 12a is released from its hinged linkage with bottom panel 18, it can be rotated over the top of side panel 12b. Thereafter, end panels 14a and 14b are rotated inwardly so as to substantially rest upon bottom panel 18. Side panel 12b is then also rotated inwardly so that it rests upon end panels 14a and 14b. Because side panel 12b is hingedly linked with bottom panel 18 and because it is resting upon end panels 14a and 14b when in the collapsed position, there is a potential for binding when collapsing trap 10. This potential problem is overcome by using hinges 30' at the interface between side panel 12b and bottom panel 18. Each hinge 30' has an internal diameter greater than that of hinges 30. In this manner, the effective pivot point for side panel 12b is elevated from the plane defined by bottom panel 18. The degree of desired elevation is determined by the resting thickness of end panels 14a and 14b when resting on bottom panel 18. Thus, if end panels 14 and 14b increase the height of the plane defined thereby whereon side panel 12b will rest, a suitably sized hinge 30 should be selected that will modify the pivot point thereof by at least that amount.

Lastly, in FIGS. 9, 10, and 11, alternative hinges 90, 92, and 94 are shown. These hinges may be used in place of hinges 30 and 30', as well as hinges 32.

What is claimed is:

1. A removable collar connector for use in rotationally connecting a first linear member to a second linear member comprising:

a first collar having a first external diameter defined by a first peripheral surface and an interior surface, and defining a substantially axially aligned slot extending from the first peripheral surface to the interior surface wherein the minimum width of the slot is sufficient to accept both the first and the second linear members and wherein the first collar has a second external diameter defined by a second peripheral surface; and a second collar having an interior surface defining an internal diameter that is at least as great as the first external diameter of the first collar and an exterior surface, and defining a substantially axially aligned slot extending from the exterior surface to the interior surface wherein the second collar is rotatably mountable about the first collar and wherein the second external diameter of the first collar is greater than the second collar internal diameter whereby when the first collar slot is aligned with the second collar slot, the first and second linear members may be disposed within the area defined by the first collar interior surface and held captive therein by misaligning the first and second slots.

2. The collar connector of claim 1 wherein the second external diameter includes an abutment portion that contacts the second collar to prevent the second collar from uniaxial movement.

3. The collar connector of claim 1 wherein the cross section of the first collar is cylindrical.

4. The collar connector of claim 1 wherein the cross section of the second collar is cylindrical.

5. The collar connector of claim 4 wherein the cross section of the first collar is cylindrical.

6. The collar connector of claim 3 wherein the first collar has shoulder portion defined by a second external diameter that is greater than the second collar internal diameter.

7. The collar connector of claim 4 wherein the first collar has shoulder portion defined by a second external diameter that is greater than the second collar internal diameter.

8. The collar connector of claim 5 wherein the first collar has shoulder portion defined by a second external diameter that is greater than the second collar internal diameter.

9. A collapsible crab trap comprising:

a base having a perimeter frame including linear members; and at least three sides each having a perimeter frame including linear members wherein each side is rotationally linked to the base, and wherein at least two sides are linked to each other, at a location where their respective linear members are adjacent to one another, by at least one removable collar connector comprising a first collar having a first external diameter defined by a first peripheral surface and an interior surface, and defining a substantially axially aligned slot extending from the first peripheral surface to the interior surface wherein the minimum width of the slot is sufficient to accept both the first and the second linear members and the open cylinder defined by the interior surface has a diameter sufficient to accept the first and the second linear members; and a second collar having an interior surface defining an internal diameter that is at least as great as the first external diameter of the first collar and an exterior surface, and defining a substantially axially aligned slot extending from the exterior surface to the interior surface wherein the second collar is rotatably mountable about the first collar whereby when the first collar slot is aligned with the second collar slot, the first and second linear members may be disposed within the open cylinder defined by the first collar interior surface and held captive therein by misaligning the first and second slots.

10. The trap of claim 9 wherein the first collar has a second external diameter defined by a second peripheral surface wherein the second external diameter is greater than the second collar internal diameter.

11. The trap of claim 10 wherein the second external diameter includes an abutment portion that contacts the second collar to prevent the second collar from uniaxial movement.

12. The trap of claim 9 wherein the cross section of the first collar is cylindrical.

13. The trap of claim 9 wherein the cross section of the second collar is cylindrical.

14. The trap of claim 13 wherein the cross section of the first collar is cylindrical.

15. The trap of claim 12 wherein the first collar has a second external diameter defined by a second peripheral surface wherein the second external diameter is greater than the second collar internal diameter.

16. A collapsible trap comprising:

a base panel having a perimeter including linear members;

a first and a second side panel each having a perimeter including linear members;

a first and a second end panel each having a perimeter including linear members; and a plurality of hinges to rotationally link each side panel and each end panel to the base panel and to rotationally link the first side panel to the second side panel wherein at least one hinge comprises a first collar having a first external diameter defined by a first peripheral surface and an interior surface, and defining a substantially axially aligned slot extending from the first peripheral surface to the interior surface wherein the minimum width of the slot is sufficient to accept both the first and the second linear members and the open cylinder defined by the interior surface has a diameter sufficient to accept the first and the second linear members; and a second collar having an interior surface defining an internal diameter that is at least as great as the first external diameter of the first collar and an exterior surface, and defining a substantially axially aligned slot extending from the exterior surface to the interior surface wherein the second collar is rotatably mountable about the first collar whereby when the first collar slot is aligned with the second collar slot, the first and second linear members may be disposed within the open cylinder defined by the first collar interior surface and held captive therein by misaligning the first and second slots.

17. The trap of claim 16 wherein the first collar slot has a trans-axial width is substantially equal to a trans-axial width of the second collar slot.

18. The collar of claim 1 wherein the first collar slot has a trans-axial width is substantially equal to a trans-axial width of the second collar slot.

19. The trap of claim 9 wherein the first collar slot has a trans-axial width is substantially equal to a trans-axial width of the second collar slot.

* * * * *